July 6, 1926.　　　　　　　　　　　　　　　　　1,591,924
A. J. LOEPSINGER
DRY PIPE VALVE
Filed April 25, 1921　　　3 Sheets-Sheet 2

INVENTOR
Albert J. Loepsinger,
Mitchell, Chadwick & Kent
ATTORNEYS

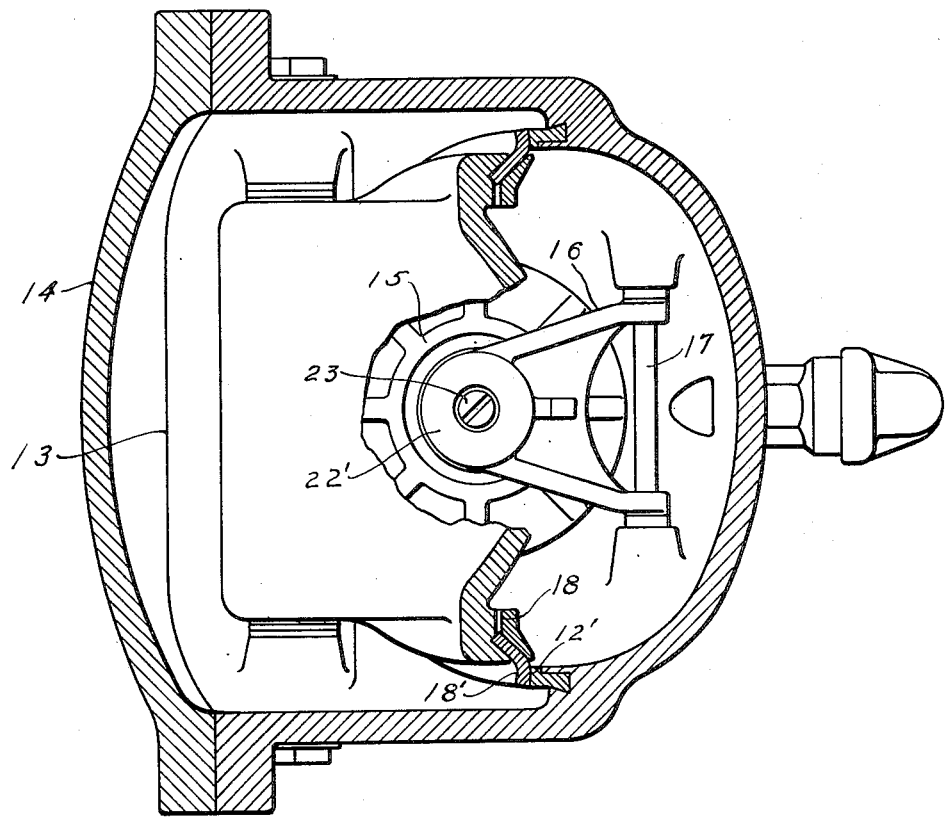

Patented July 6, 1926.

1,591,924

UNITED STATES PATENT OFFICE.

ALBERT J. LOEPSINGER, OF EDGEWOOD, RHODE ISLAND, ASSIGNOR, BY MESNE ASSIGNMENTS, TO GENERAL FIRE EXTINGUISHER COMPANY, OF PROVIDENCE, RHODE ISLAND, A CORPORATION OF DELAWARE.

DRY-PIPE VALVE.

Application filed April 25, 1921. Serial No. 464,154.

This invention relates to improvements in dry-pipe valves for automatic sprinkler systems. It is an object of the invention to provide a valve which is improved in a number of respects, as compared with existing practice, among which are reduced size of valve for a given capacity of flow; reduced initial cost; simplified manufacture; and easier inspection, setting and general operation of the valve, resulting in its maintenance and repair with greater certainty and with less expense,—all of these improvements being by comparison with differential valves, which I believe represent the furthest advance thus far attained by any one in practicable dry-pipe valves. The improvement of the present invention provides a water clapper set perpendicularly across the inflow passage and an air clapper set above it and obliquely across the same, but in the present case these are pivoted on opposite sides of the passage and upon opening they slide across each other from their positions of rest, at which the air clapper is pressing down on the water clapper, as they swing open in opposite directions.

The large air clapper, when arranged as herein shown, need swing only through a transverse arc long enough for its outer edge to cross the water-way, without having also to draw the water clapper clear, and can cease its opening movement as soon as it clears the water-way. The water clapper can execute its movement to wide open position almost entirely within the intermediate chamber. In consequence, the total size of the valve is materially reduced. The setting of the pivot of the water clapper in a slot permits that clapper to lift slightly, at first opening, swinging on an arc around the pivot of the air clapper without slipping thereon, until its own pivot engages the lower end of its slot. This lets water freely into the intermediate chamber, in sufficient volume to close the drip valve and fill the chamber, applying pressure of water to the air clapper direct. And this in turn lifts the air clapper, relieving the pressure thereof down on the water clapper, so that the water clapper can slip across its bearing on the under face of the air clapper without material friction. As the total clapper weight is divided between two bodies moving in opposite directions the momentum of each is slight; the two momentums are opposed to each other; and the opening action is consequently mild. Other advantages resulting from the improvement are set forth hereinafter.

Inasmuch as the principles of the invention may be applied in various ways, the accompanying drawings are merely illustrative of one such application, and it is to be understood that the scope of the invention is not limited to the particular embodiment shown. It is intended that the patent shall cover, by suitable expression in the appended claims, whatever features of patentable novelty exist in the invention disclosed.

In the drawings:

Figure 4 is a plan of the valve, in section on the line 4—4 of Figure 1, and with part of the air clapper broken away to expose the water clapper.

Figure 1:
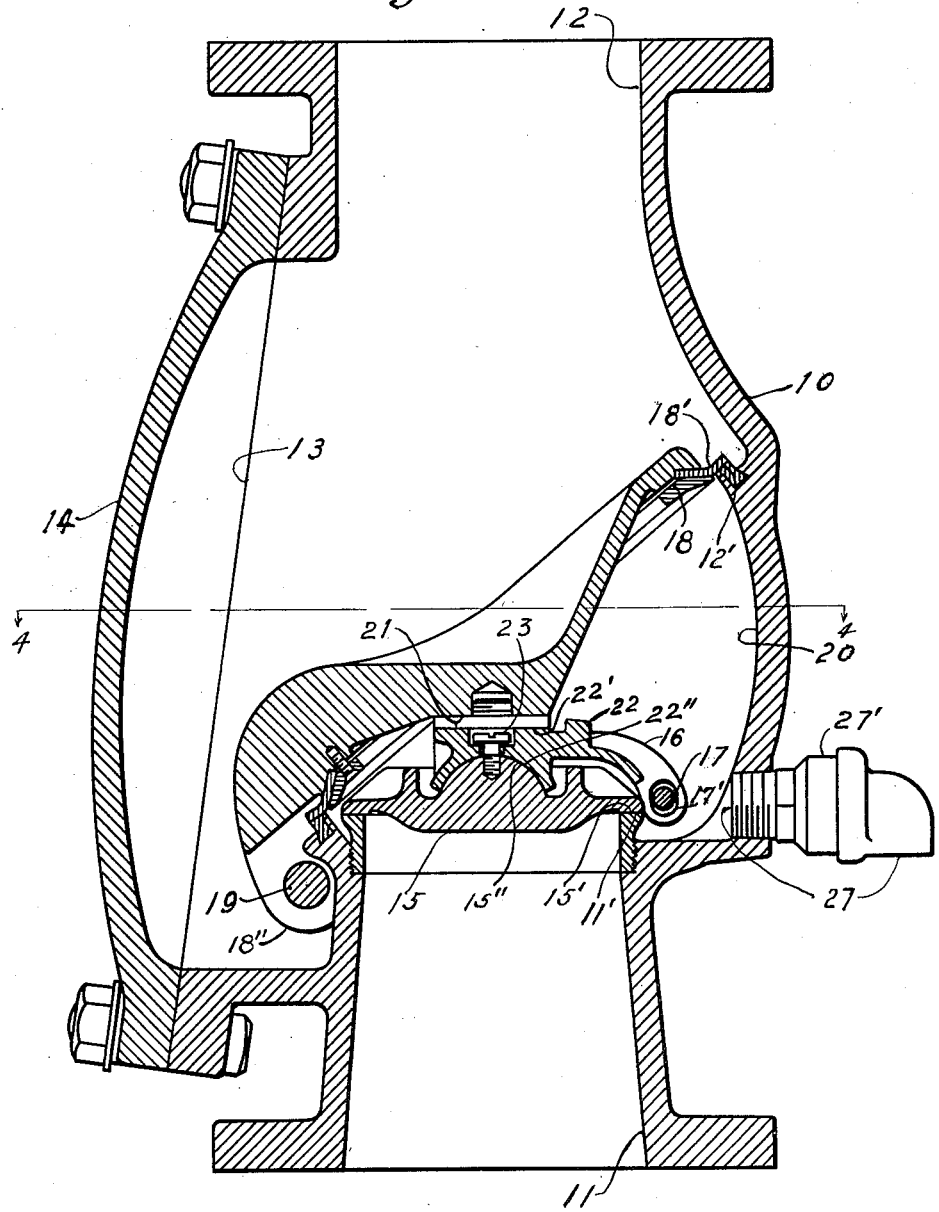
Figure 1 is a side elevation of a valve with the casing cut in a medial section, the valve being closed, incidental appliances being omitted.
Figure 2:
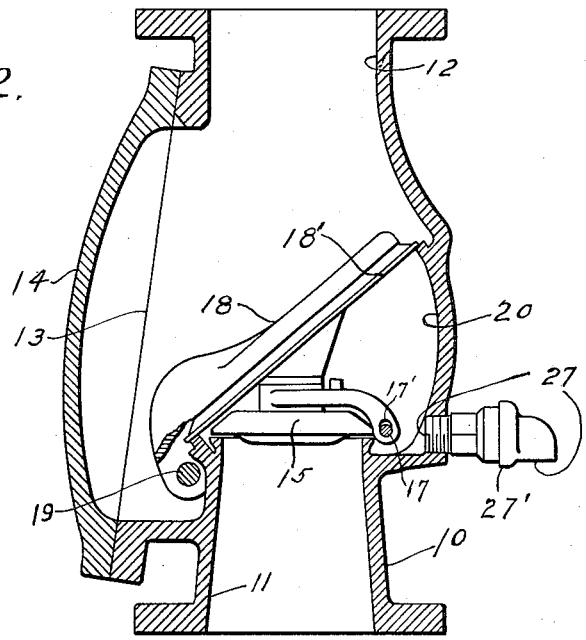
Figure 2 is a similar view with the valve in the initial stage of opening.
Figure 3:
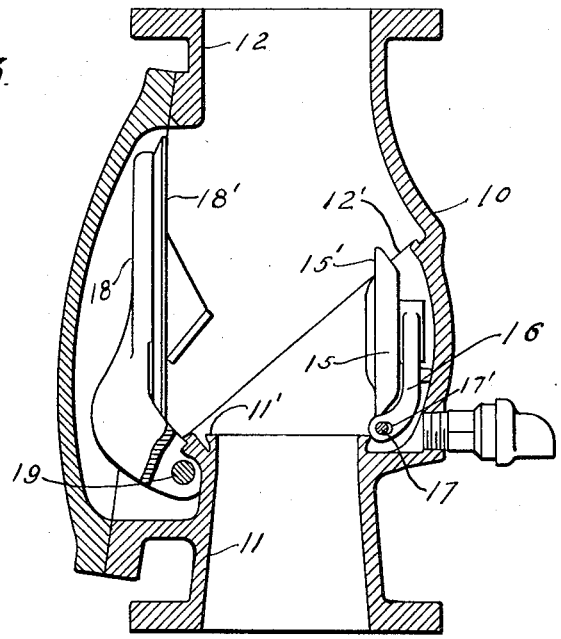
Figure 3 is like Figure 2 with the clappers in the final position of opening.

Referring to the drawings, the casing 10 has an inlet opening 11, an outlet opening 12, and a hand hole 13 closed by a removable lid 14 in the usual manner for permitting access to the interior for inspection, setting, or other purposes. There is a water clapper 15 adapted to close the passage 11, preferably having a metallic face 15' which shuts down upon the seat 11', this valve being swung on an arm 16 from a pivot 17 at one side of the water-way; and there is an air clapper 18 preferably having a rubber edge 18' closing down upon a seat 12' set obliquely across the water-way, being carried by an arm which is pivoted at 19 on the side of the water-way which is opposite the pivot of the water clapper. When these two valves are closed, water under high pressure, which according to common present practice is preferably about 60 pounds per square inch, stands up to the water clapper 15; and air under lower pressure, which according to common present practice is about 15 pounds or more per square inch, presses down upon the air clapper 18, and so keeps the water clapper closed. Between the two clappers is an intermediate chamber 20 which normally is open to atmosphere through a drip passage 27, wherein is a valve of type well known, adapted to permit escape of water from the intermediate chamber 20 so long as the flow is slight, but adapted to close automatically when the flow tends to become considerable. The air clapper pivot is close to the water way, is below the plane of the water clapper, and is set loosely in its bearing. The connection of air clapper and water clapper is through a plane bearing plate 21 on the bottom face of the air clapper, and an intermediate plate 22 having a plane upward facing bearing surface 22′ coacting therewith, and a spherical downward facing bearing surface 22″ at its bottom coacting with a spherical bearing surface 15″ on the top of the water clapper 15. A screw 23 with broad head and loose fit for its shank holds this intermediate plate to the water clapper, with sufficient looseness so that the latter can shift on its spherical bearing to find a good seat automatically, yet with sufficient security owing to the broad head so that the intermediate plate and its arm swing with the water clapper. The structure described for plane and spherical bearings and for securing the plate and water clapper together permits the assembly to be made with only two screws, with automatically correct bearings of water clapper both on the air clapper and on its own valve seat; and insures the full advantage of the total differentials of area and of leverage, notwithstanding the freedom of the water clapper to lift by virtue of the slot 17′ holding its pivot 17. This is a short slot which extends in the direction in which the water clapper swings about pivot 19 when it and the air valve start to open. This slot and its action are illustrated in Figures 1, 2 and 3, the first of which shows the valve with the water clapper seated, while Figure 2 shows it slightly raised above its seat, as may happen when the air pressure has diminished sufficiently so that the valve is beginning to be over-balanced. In the case illustrated in Figure 2 the flexible rubber rim 18′ of the air clapper must be understood to be bent to a less degree than in Figure 1. The length of slot 17′ is sufficient to let the water clapper open enough for water to flow rather freely into the intermediate chamber, so as to close the drip valve, while still the air valve remains seated, the air clapper's movement corresponding to that of the water clapper having been accompanied by a yielding of its flexible edge, without opening. These movements occur about the pivot 19, because the pressure of air on the clapper 18, effective at its center of gravity and normal to its plane, passes to the right of the spherical bearing 22″, 15″, and thus keeps the air clapper as a whole tilted to the right around spherical bearing 15″, with its ears 18″ up against the pivot 19, so that the forces which apply are necessarily a system of moments while the clapper 15 is tightly closed.

This arrangement of seats, perpendicular and oblique to the water-way, permits the obtaining of a large differential in a small space, by reason of the combined differential of area and differential of leverage with pivot close to the water-way and below the plane of the air clapper. The mounting of the air and water clappers so as to turn about separate axes, disposed on opposite sides of the water-way, is a feature of the present invention. The provision of the pivot slot 17′ is another feature. The two features in combination produce a quick, smooth opening of the valve as a whole; facilitate its setting for use, and its inspection, cleaning and repair; lessen the danger of damage which is present when one man out in the field attempts to handle alone the necessarily heavy parts of the former type of valve; and reduce the labor and the machining and material costs of manufacture.

The considerable reduction of size, in a valve of given capacity, resulting from the structure described, as compared with previous structures, reduces metal, and makes manufacture, shipping and handling easier, as well as facilitating layouts for installations. The separability of air and water clappers which results, makes each part more easily machined and handled than a combined unit can be; and removes the danger of striking the heavy water clapper upon the babbitted air valve seat, making a dent therein when the air valve is being removed, as for example to renew the rubber sealing edge. In setting a valve of this character it is essential to remove grit and other foreign matter from the under-surface of the rubber diaphragm, from the babbitt seat on which it rests and from the contacting metallic surfaces of the water clapper and its seat. With the valve of the invention, and unlike some valves heretofore proposed, this can be done conveniently and with certainty because when the hand-hole plate 14 has been removed and the water clapper lifted, the underside of this clapper faces the observer, and there is no obstruction between the observer and it or its seat. And renewal of the rubber on the air clapper, which may be desirable after a number of years' use, can readily be accomplished by one man without tackle and without damage to any valve seat, because the air valve can be removed without disturbing the water valve. The relative lightness of the air valve and the ease with which the retaining ring which holds the rubber ring in place can be removed, makes the whole operation one of great convenience and safety. In cases where the presence of hard foreign matter brought in by the water has caused injury, making it necessary to grind the clapper and its seat together, this operation can be accomplished readily as compared with other constructions in which it is necessary first to separate the water clapper from the air clapper. When the valve has been set and is about to operate, the relation of the air and water pressure being such that they are approximately balanced through the differential, with the air pressure diminishing, the first action is a slight lifting of the water clapper from the position of Figure 1 to that of Figure 2 with corresponding lifting of the air clapper, but without the latter becoming unseated. In this condition the intermediate chamber rapidly fills with water which closes the drip valve 27' and exerts pressure on the underside of the air clapper. As the superior water pressure which is, say six times the air pressure, has hitherto been applied only to the underside of the water clapper but now is applied to the underside of the very much larger air clapper, the latter is lifted further and relieves the friction between the plane surface of the stud plate 21 and the intermediate arm 22 so that these surfaces can slide across each other, or more strictly, so that the edge of the top of the intermediate plate 22 can slide across the bottom of the stud plate 21 as the two clappers swing open in opposite directions. The friction is so reduced by the release of pressure that it becomes negligible. Furthermore, if by chance there is a sticking of rubber of the air clapper to its seat, the full water pressure is applicable to the full area of the air clapper in order to break the rubber away. The water clapper and the air clapper therefore swing rapidly to their open positions leaving a clear water way. Thus, although the two valves are separate for purposes of manufacture, repair, maintenance and inspection, they nevertheless act as one combined valve, each opposing the other as if they were a single unit when set; and in so far as their action is separate, when opening, it is action in opposite directions, so that it is free from shock and stress.

I claim as my invention:

1. In a dry-pipe valve, a casing with separate air and water clappers of differential angle, area and leverage, provided with surfaces arranged to engage when the clappers are in closed position, said clappers being so mounted that, when closed, the engaging surfaces are pressed together by the respective air and water pressures acting on said clappers along lines oblique to each other, and that, when opened, they are disposed on opposite sides of the waterway, the mounting providing means which enables the separation of the two clappers in their opening movement.

2. In a dry-pipe valve a casing with cooperating differential air and water clappers pivotally mounted, the air clapper being seated oblique to the axis of the water way and the water clapper perpendicular thereto; the air clapper being mounted to open on a path starting abruptly across the water way toward one side, and the water clapper being mounted to open on a path toward the opposite side of the water way, and there being means which enables the separation of the two clappers in their opening movement.

3. In a dry-pipe valve a casing with cooperating differential air and water clappers pivotally mounted and arranged to bear together when closed and to separate when opening, moving in different directions when turning initially on their pivots; there being a plane bearing between them and provision for the water clapper to be lifted slightly without slip on said plane bearing, whereby water is admitted to press on the air clapper.

4. In a dry-pipe valve a casing with cooperating differential air and water clappers mounted so as to bear together when closed and to travel to opposite sides of the water way when open, moving in different directions when turning initially on their pivots; there being a flexible yielding rim in the air clapper and provision in the mounting of the water clapper whereby the water clapper may open slightly in the direction of movement of the air clapper, preliminary to its said opening travel to the side.

5. In a dry-pipe valve a casing with cooperating differential air and water clappers pivotally mounted so as to bear together when closed and to open toward opposite sides of the water way, moving in different directions when turning initially on their pivots; there being a slot for the pivot bearing of the water clapper, permitting a preliminary opening in the direction of the air clapper opening.

6. In a dry-pipe valve a casing with cooperating differential air and water clappers mounted so as to press together when closed, and in opening to travel to opposite sides of the water way; there being between the air clapper and the water clapper a plane bearing and a spherical bearing, at one of which the separation occurs when the clappers open.

7. In a dry-pipe valve a casing with cooperating differential air and water clappers mounted so as to press together when closed, and in opening to travel to opposite sides of the water way; there being between the air clapper and the water clapper a spherical bearing and a plane bearing, the separation occurring at said plane bearing when the clappers move apart for the valve opening.

8. In a dry-pipe valve a casing with co-operating differential air and water clappers mounted so as to press together when closed, and in opening to travel to opposite sides of the water way; there being between the air clapper and the water clapper a plane bearing and a spherical bearing whereby the pressure between the two clappers is distributed; there being a bearing for the pivotal mounting of the water clapper wherein the bearing parts are not in bearing together when the valve is closed but come into bearing after a slight preliminary opening movement.

9. In a dry-pipe valve a casing with separately pivoted co-operating differential air and water clappers, the locations of the pivots being such that the clappers move toward the opposite sides of the water way; and a spherical bearing between them and arranged between two loosely connected parts of one of them, and also arranged and comprising a fulcrum between the air valve pivot and the air pressure axis, combined with a central screw loosely passing through one of the members of the spherical bearing, having a head engaging said member and a shaft engaging the other member, whereby the bearing parts are held together in operative relation when loose, such that on application of air pressure they assume positions making the initial opening movement effected by water pressure a swinging of water and air clappers jointly about the air pivot preceding their separate swinging to opposite sides.

10. In a dry-pipe valve a casing with co-operating differential air and water clappers mounted so as to travel to opposite sides of the water way when opening, said mounting including an intermediate arm loosely pivoted on the casing and having upward and downward faces comprising plane and spherical bearings against the two said clappers and being connected to the water clapper so as to guide its opening.

11. In a dry-pipe valve a casing with co-operating differential air and water clappers pivotally mounted on opposite sides of the water way; the air clapper being seated oblique and the water clapper perpendicular thereto; and the mounting of the water clapper including an intermediate arm which contains the pivot and reaches in between the clappers having a plane face bearing toward the air clapper and a spherical face bearing toward the water clapper; there being a stud screwed into the air clapper on the axis of the closed water clapper, said stud having a plane head constituting a bearing against said intermediate arm when the clappers are closed.

12. In a dry-pipe valve a casing with co-operating differential air and water clappers pivotally mounted at opposite sides of the water way, the air clapper being oblique and the water clapper perpendicular thereto; and co-operating bearing plates one on each clapper held thereto by a single central screw at the axis, combined with means which enables the separation of the two clappers to occur in their opening movement.

13. In a dry-pipe valve a casing with co-operating differential air and water clappers, the air clapper being oblique and the water clapper perpendicular to the water way and the two pressing together with the air clapper covering the water clapper in close conjunction when closed; means enabling separation of the clappers in their opening movement; and means whereby the air clapper is separately removable from the water clapper and from the axis.

14. In a dry pipe valve, a casing with air and water clappers of differential area, co-operating when closed, and separated when open, being mounted for travel initially together about the pivot of the air valve until water is admitted for lifting the air valve separately, and thereafter for travel severally to opposite sides of the water way.

15. A dry pipe valve having in combination separate air and water clappers, and means for mounting said clappers so that in the initial part of the opening movement of the valve both clappers move about the same axis of rotation and in the subsequent part of the opening movement of the valve said clappers move about separate axes.

16. A dry pipe valve having in combination air and water clappers, and mounting means for said clappers on which, in opening, the clappers initially move as a unit and subsequently move relative to each other, separating.

17. A dry pipe valve having in combination an air clapper and a water clapper arranged and mounted to turn about separate axes; and means adapted to permit the water clapper in opening to move initially about the axis of the air clapper and to move subsequently about its own axis upon the opening of the air clapper.

18. A dry pipe valve, comprising cooperating air and water clappers pivotally mounted and arranged to bear together when closed and to separate when opening; an intermediate chamber between said clappers having a drain normally open but provided with a valve which permits small drainage flow but closes upon large drainage flow; and means providing for initial opening of the said clappers, sufficient to admit supply water in flow large enough to close said drainage valve, whereby said water reaches the air clapper, said means also providing so that the bearing relation of said clappers to each other is meanwhile maintained substantially unchanged.

19. A dry pipe valve having in combination separate air and water clappers; pivots at different sides of the waterway, on which the clappers are separately mounted, and whereon they swing apart in opening; and co-operating abutments, one on each clapper, arranged so as to be engaged together when the clappers are closed, transmitting the pressure by which the air clapper holds the water clapper closed; the air clapper having an area greater than that of the water clapper, and being arranged with the distance from its pivot to its point of engagement with the water clapper less than the distance from its said pivot to the centre of pressure of air on the air clapper, there being means enabling separation of the clappers in their opening movement.

20. A dry pipe valve having in combination separate air and water clappers; pivots at different sides of the waterway, on which the clappers are separately mounted, and whereon they swing apart in opening; and cooperating abutments one on each clapper, arranged so as to be engaged together when the clappers are closed, transmitting the pressure by which the air clapper holds the water clapper closed; the air clapper having an area greater than that of the water clapper, and being arranged with the distance from its pivot to its point of engagement with the water clapper less than the distance from its said pivot to the centre of pressure of air on the air clapper; and with the respective valve seats and pivots so located relative to each other that the arm of the moment about the pivot of the air clapper, resulting from air pressure and tending to close the air clapper, exceeds in length the arm of the moment about the pivot of the water clapper, resulting from water pressure and tending to open the water clapper, there being means enabling separation of the clappers in their opening movement.

21. A dry pipe valve having in combination separate air and water clappers; pivots at different sides of the waterway, on which the clappers are separately mounted, and whereon they swing apart in opening; and co-operating abutments, one on each clapper, arranged so as to be engaged together when the clappers are closed, transmitting the pressure by which the air clapper holds the water clapper closed; the air clapper having an area greater than that of the water clapper, and being arranged with the distance from its pivot to its point of engagement with the water clapper less than the distance from its said pivot to the centre of pressure of air on the air clapper and with the respective valve seats and pivots so located relative to each other that the arm of the moment about the pivot of the air clapper, resulting from air pressure and tending to close the air clapper exceeds in length the arm of the moment about either pivot, resulting from water pressure and tending to open the water clapper and the air clapper, there being means enabling separation of the clappers in their opening movement.

22. A dry pipe valve having in combination separate air and water clappers; pivots at different sides of the waterway, on which the clappers are separately mounted, and whereon they swing apart in opening; means enabling separation of the clappers in their opening movement; rigid seats for the two said clappers, fixed in the valve; the two said clappers being arranged to engage together with non-yielding contact when the water clapper is on its seat, whereby the air clapper rigidly holds the water clapper closed; and one of said clappers having a resilient part for engaging its own seat when the air clapper is engaged rigidly on the water clapper.

23. A dry pipe valve comprising in combination co-operating differential air and water clappers arranged oblique to each other, having, when closed, a contact together which as between the clappers is non-yielding in the direction of axis of water clapper; said clappers being pivotally mounted so as to swing to opposite sides of the waterway in opening; and the said mountings and contact being adapted to maintain the point of application of the one clapper on the other substantially unchanged, during an initial slight opening movement of the water clapper until water becomes effective to open the air clapper.

Signed at Boston, Massachusetts, this twenty-first day of April, 1921.

ALBERT J. LOEPSINGER.